G. A. SITZLER.
THREE-PIECE MOLD.
APPLICATION FILED FEB. 4, 1921.
1,396,293.
Patented Nov. 8, 1921.
2 SHEETS—SHEET 1.
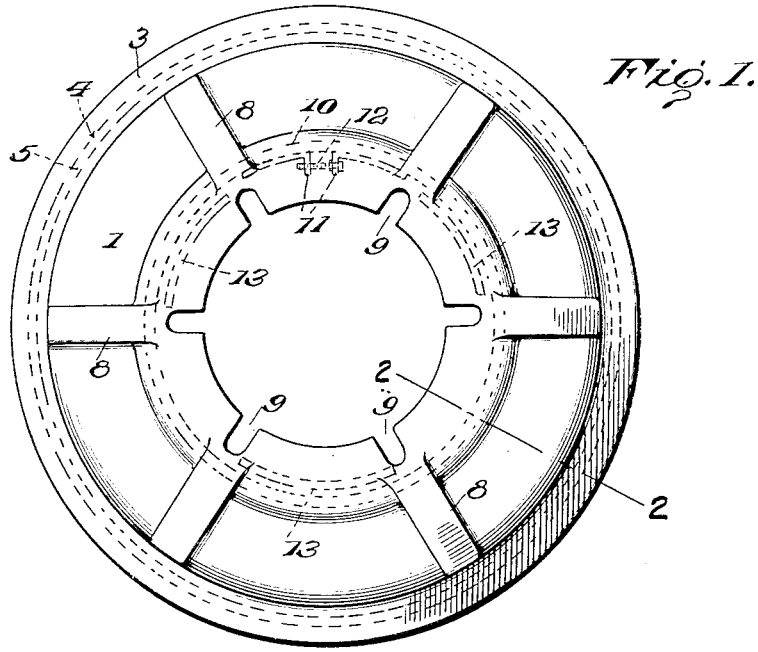
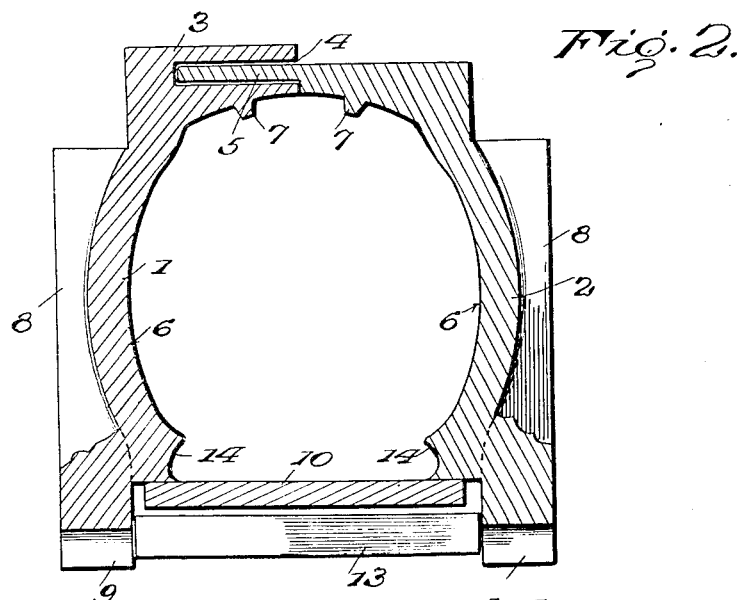
Guy A. Sitzler, INVENTOR.
BY Fred P. Lorin, ATTORNEY.

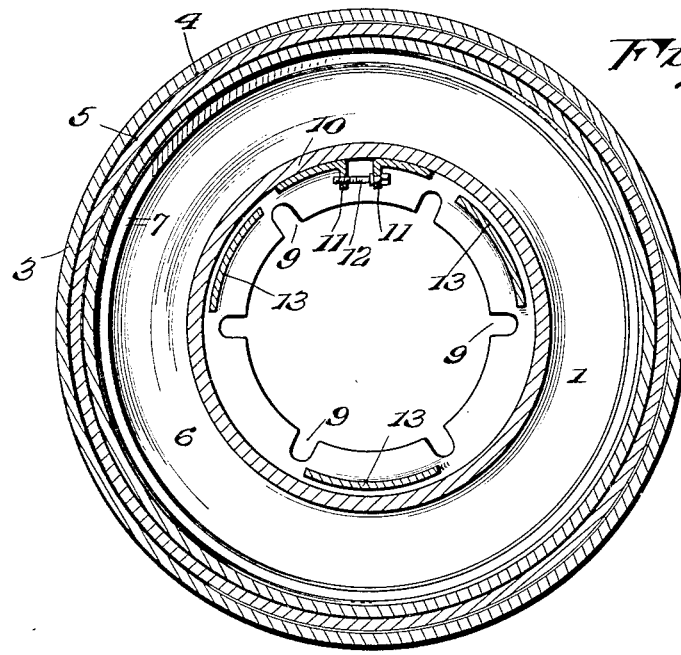//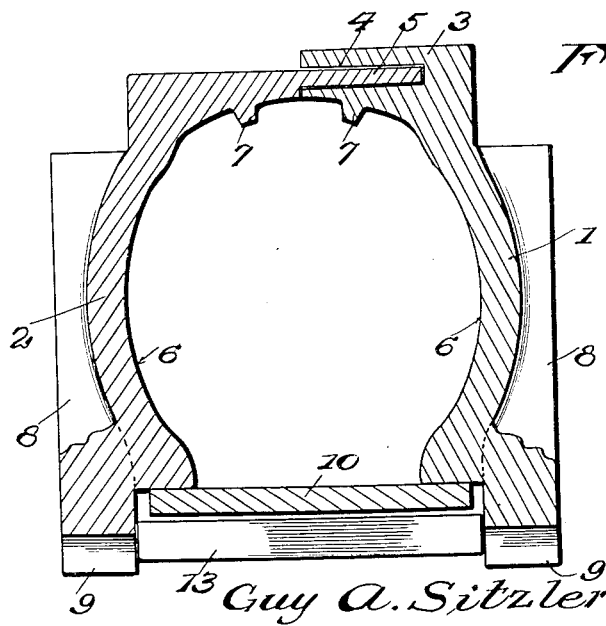

UNITED STATES PATENT OFFICE.

GUY A. SITZLER, OF TACOMA, WASHINGTON, ASSIGNOR TO DUTHO RUBBER COMPANY, OF PIERCE COUNTY, WASHINGTON.

THREE-PIECE MOLD.

1,396,293.      Specification of Letters Patent.      Patented Nov. 8, 1921.

Application filed February 4, 1921. Serial No. 442,473.

*To all whom it may concern:*

Be it known that I, GUY A. SITZLER, a citizen of the United States, and residing at Tacoma, in the county of Pierce and State of Washington, have invented certain new and useful Improvements in Three-Piece Molds, of which the following is a specification.

This invention relates to improvements in tire molds, constructed in sections and formed to adjustably coöperate in a simple and convenient manner.

The improved mold comprehends a means for maintaining the spacing of the inner edges of the mold section and also a rim which may be adjusted in its diametric proportion to provide for closing the inner edge of the mold section.

In the drawings:—

Figure 1 is a side elevation of the improved mold.

Fig. 2 is an enlarged section on line 2—2 of Fig. 1.

Fig. 3 is a vertical central section through Fig. 1.

Fig. 4 is a view corresponding to Fig. 2 with the mold designed for a slightly different type of tire.

In the drawings the mold proper is made up of sections 1 and 2, which coöperatively form the side walls and tread portion of the tire. One of the sections as 1 is formed at the outer edge with a circumferential enlargement 3 which from its relatively inner free edge is recessed or cut away at 4. The opposite mold section 2 is formed on the relatively inner edge with a projecting lip 5 adapted to loosely seat in the recess 4, whereby the mold sections may be separated the distance desired in accordance with the tire being molded without actually separating the sections. The inner surface of each section is formed at 6 in accordance with the external shape of the tire described, any contemplated non-skid formation as 7 being formed on the sections at the appropriate point.

Reinforcing ribs 8 extend radially of the respective sections, these sections at their inner ends in line with the ribs being formed with recesses 9. A removable rim 10, of the width appropriate for the width of the contemplated tire, is designed to be placed between the sections 1 and 2 and bear against the lower edges of the formed tire portions of such sections, as clearly shown in Figs. 2 and 4. This rim 10 is a split rim and the meeting ends thereof have lateral projections 11 adapted to be secured together to define the rim formation by bolts 12. Spacing sections 13 are arranged inwardly of the rim 10 at appropriate spaced intervals circumferentially of the mold. The interior surface 6 of the tire forming portion proper of the mold may be formed with recesses 14 to provide for the usual bead projection as in the clencher type of tire, or may be otherwise formed, as indicated in Fig. 4, for the straight side formation.

The formed tire to be molded and vulcanized is placed in one of the rim sections, preferably that including the lip 5. The other section is then applied, following which the rim 10, which is in the particular instance of the size defining the inner limit of the tire, is positioned, and the spacing bars 13 applied. The molds are then placed in the vulcanizing press and may, if desired, be arranged in superimposed relation to provide for the simultaneous vulcanization of a number of such. If additional pressure is required, the recesses 9 are adapted to receive bolts which, headed on one end and receiving nuts on the other end, may be utilized to provide the necessary pressure.

Claims:

1. A tire mold comprising a plurality of sections, including tread forming portions integrally formed with complementary portions for a sliding interfit, and side walls integral with the tread forming portions, reinforce projections overlying the side walls, and a rim to be removably inserted between said reinforce sections to define the limit of the forming side walls, the complementary portions being formed wholly to one side of the circumferential center line of the mold.

2. A tire mold comprising a pair of annular sections forming side walls of the mold and having the tread portion integral therewith, the edges of the sections at the tread portion being formed to adjustably interfit, each section being also formed with an inwardly projecting flange having recesses therein, a rim fitting against the inner periphery of the sections between the flanges to form the inner portions of the mold, spacing members disposed between and engaged by the flanges, and means for securing the sections together engaging the flanges and disposed in the recesses formed therein.

3. A tire mold comprising a pair of annular sections for forming the side portions of the tire mold and each having a projection thereon forming part of the tread portion and adjustably interfitting with the other section, an expansible rim fitting against the inner periphery of the sections to form the inner part of the mold, spacing members engaging between the side members inside the circumference formed by the rim, and means for securing the mold together engaging the side sections along the inner annular edge portion.

4. A tire mold comprising a pair of sections, each adapted to form one side wall and a portion of the tread, one section having a groove and the other a tongue adapted to fit in said groove, and each section being formed with an inwardly projecting radial flange, a rim engaging the inner peripheries of the sections between the flanges, spacing members engaging the flanges for spacing the sections, and means engaging the flanges adapted to hold the parts in mold forming position.

5. A tire mold comprising a pair of sections, each adapted to form one side wall and a portion of the tread, one section having a groove adapted to receive a tongue on the other section, each section formed on the other section, each section being formed with radial reinforcing ribs and an inwardly projecting flange formed with recesses in alinement with the reinforcing ribs, a rim engaging the inner peripheries of the sections between the flange, spacing members placed between the flanges for spacing the sections, and securing means for locking the sections in mold forming position engaging in the recesses in the flanges.

In testimony whereof I affix my signature in the presence of two witnesses.

GUY A. SITZLER.

Witnesses:
HARRY DAVENPORT,
FLORA M. PRENGUBER.